United States Patent
Neb et al.

(10) Patent No.: US 9,701,421 B2
(45) Date of Patent: Jul. 11, 2017

(54) METHOD FOR DETERMINING THE POSITION OF A COMPONENT IN A HIGH LIFT SYSTEM OF AN AIRCRAFT, HIGH LIFT SYSTEM OF AN AIRCRAFT AND AIRCRAFT

(71) Applicant: Airbus Operations GmbH, Hamburg (DE)

(72) Inventors: Eugen Neb, Hamburg (DE); Jörg Wyrembek, Hamburg (DE); Vincent Maire, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 39 days.

(21) Appl. No.: 14/720,013

(22) Filed: May 22, 2015

(65) Prior Publication Data

US 2015/0336683 A1 Nov. 26, 2015

(30) Foreign Application Priority Data

May 23, 2014 (EP) .................................. 14169679

(51) Int. Cl.
*B64D 45/00* (2006.01)
*B64C 9/00* (2006.01)
(Continued)

(52) U.S. Cl.
CPC ............ *B64D 45/0005* (2013.01); *B64C 9/00* (2013.01); *B64C 9/16* (2013.01); *B64C 9/22* (2013.01);
(Continued)

(58) Field of Classification Search
CPC B64C 9/00; B64C 13/16; B64C 13/28; B64C 9/16–9/26; B64C 19/00; B64D 2045/001; B64D 45/00–45/0005
(Continued)

(56) References Cited

U.S. PATENT DOCUMENTS 4,971,267 A * 11/1990 Fulton ..................... B64C 13/24
244/99.9
6,382,566 B1 5/2002 Ferrel et al.
(Continued)

FOREIGN PATENT DOCUMENTS

CN 101346276 A 1/2009
CN 101389532 A 3/2009
(Continued)

OTHER PUBLICATIONS

European Patent Office, European Search Report for European Patent Application No. 14169679.9 mailed Nov. 3, 2014.
(Continued)

*Primary Examiner* — Bao Long T Nguyen
(74) *Attorney, Agent, or Firm* — Lorenz & Kopf, LLP.

(57) ABSTRACT

A method for determining the position of a component in a high lift system of an aircraft, the high lift system comprising a central power control unit for providing rotational power by means of a transmission shaft; and actuator drive stations coupled with the power control unit and movable high lift surfaces. The method comprises the steps of acquiring a first rotational position of a first position pick-off unit mechanically coupled with the power control unit by means of a first gear having a first gear ratio, acquiring at least one second rotational position of at least one second position pick-off unit mechanically coupled with a driven element in at least one drive station, and determining the number of full rotations the first position pick-off unit has already accomplished between a neutral position and an intended maximum number of rotations.

8 Claims, 4 Drawing Sheets

(51) Int. Cl.
*B64C 13/16* (2006.01)
*B64C 9/16* (2006.01)
*B64C 9/22* (2006.01)
*B64C 13/18* (2006.01)
*B64C 13/28* (2006.01)

(52) U.S. Cl.
CPC .............. *B64C 13/16* (2013.01); *B64C 13/28* (2013.01); *B64D 2045/001* (2013.01)

(58) Field of Classification Search
USPC .............................................. 701/4, 34.4, 14
See application file for complete search history.

(56) References Cited

U.S. PATENT DOCUMENTS

| | | | |
|---|---|---|---|
| 2005/0151027 A1* | 7/2005 | Recksiek | B64C 13/503 244/211 |
| 2006/0145028 A1* | 7/2006 | Richter | B64D 45/0005 244/216 |
| 2007/0080261 A1* | 4/2007 | Neumann | B64D 45/0005 244/194 |
| 2010/0039104 A1* | 2/2010 | Petersen | B64D 45/0005 324/207.25 |
| 2010/0059633 A1 | 3/2010 | Pohl | |
| 2010/0288886 A1* | 11/2010 | Schievelbusch | B64D 45/0005 244/194 |
| 2011/0062282 A1* | 3/2011 | Richter | B64C 13/42 244/99.4 |
| 2012/0138751 A1 | 6/2012 | Richter et al. | |
| 2012/0325976 A1* | 12/2012 | Parker | B64C 9/22 244/203 |
| 2013/0334372 A1 | 12/2013 | Marques et al. | |
| 2014/0027580 A1* | 1/2014 | Christmann | B64C 9/16 244/213 |
| 2014/0336891 A1* | 11/2014 | Heintjes | F16D 43/02 701/68 |
| 2015/0076283 A1* | 3/2015 | Schievelbusch | B64C 9/18 244/99.3 |

FOREIGN PATENT DOCUMENTS

| | | |
|---|---|---|
| CN | 102046467 A | 5/2011 |
| CN | 102458995 A | 5/2012 |
| EP | 1695906 A1 | 8/2006 |

OTHER PUBLICATIONS

The People's Republic of China, Chinese Office Action for Chinese Patent Application No. 201510267073.1 mailed Jul. 20, 2016.

* cited by examiner

METHOD FOR DETERMINING THE POSITION OF A COMPONENT IN A HIGH LIFT SYSTEM OF AN AIRCRAFT, HIGH LIFT SYSTEM OF AN AIRCRAFT AND AIRCRAFT

CROSS-REFERENCE TO RELATED APPLICATION

This application claims priority to European Patent Application No.: 14 169 679.9 filed 23 May 2014, which is incorporated herein by reference in its entirety.

TECHNICAL FIELD

The embodiments described herein relate to a method for determining the position of a component in a high lift system of an aircraft, a high lift system of an aircraft, and an aircraft.

BACKGROUND

A high lift system of an aircraft serves the purpose of lift and drag management for the aircraft. A high lift system is usually composed of a leading edge slat system and a trailing edge flap system. Many flap systems in civil and military aircraft are equipped with a central drive unit, which is also known as a power control unit (PCU), which drives a transmission shaft train and local mechanical actuator devices, the so-called drive stations, on corresponding flap support stations of the movable flaps. The high lift settings are selectable by a cockpit crew through a flaps lever, through which a flap angle is selectable.

The transmission system provides a load path from the central drive unit to all actuator outputs. This ensures a symmetrical deployment of all flap devices. Flap kinematics finally transform the rotary motion driven by the drive station, into required surface movements. The high lift flap system is usually controlled and monitored by two flap control computers. System drive commands primarily originate from a flaps lever input. The surfaces will be driven to a predetermined position that are laid down in the algorithms in the flap control computers. For achieving a high accuracy in driving the flap system to the predetermined position, flap drive system positions are continuously fed back by a feedback position pick-off unit (FPPU) attached to the drive unit and enabling smooth and accurate surface deployment. The feedback position pick-off unit is connected to the drive unit and comprises an internal gear-box to dedicate an equivalent system angle. In common high lift flap systems, the flap position is detected through the feedback position unit, wherein the working range of the feedback position pick-off unit is limited to one rotation (360°).

Further sensors are dedicated to system failure monitoring such as stations position pick-off units (SPPU), which are connected to individual drive stations to dedicate an equivalent angle for each station for system monitoring purposes.

In addition, other objects, desirable features and characteristics will become apparent from the subsequent summary and detailed description, and the appended claims, taken in conjunction with the accompanying drawings and this background.

SUMMARY

While the general setup of a high lift system is usually maintained for various aircraft types, individual system parameters may often change throughout different aircraft types. For example, the rotational speed of transmission shaft trains may vary and gear ratios in the drive stations may also be adapted to the actual aircraft type. Consequently, the position pick-off units need to be adjusted for the actual parameters of the components in the high lift system. For example, the gear ratio in the position pick-off unit should be adapted to the rotational speed and the number of rotations the transmission shaft train accomplishes between a neutral position and a (theoretical) end position. This may require a further certification and an increased part variety.

A method is therefore proposed for determining the position of a component in a high lift system of an aircraft, which does not require individual position pick-off units or other adapted sensors for acquiring a rotational position of the components in a high lift system.

According to an advantageous embodiment, a method for determining the position of a component in a high lift system of an aircraft is proposed, the high lift system comprising a central power control unit for providing rotational power by means of a transmission shaft; and actuator drive stations coupled with the power control unit and movable high lift surfaces; the method comprising the steps of acquiring a first rotational position of a first position pick-off unit mechanically coupled with the power control unit by means of a first gear having a first gear ratio, acquiring one second rotational position of at least one second position pick-off unit mechanically coupled with a driven element in at least one drive station, determining the number of full rotations the first position pick-off unit has already accomplished between a neutral position and an intended maximum number of rotations based on an associated number of angle sections of the second position pick-off unit working range and the actual second rotational position, multiplying the number of full rotations of the first position pick-off unit with 360° and adding the resulting full rotations angle to the measured first rotational position to acquire the first rotational position.

The resulting first rotational position may afterwards be divided by 360° and multiplied with the first gear ratio, leading to the number of full rotations of the transmission shaft, to which the first position pick-off unit is coupled. In this regard it is noted that the above description and defines a rotational position based on degrees (DEG). However, this may also be conducted through radians (RAD), which is equivalent.

Consequently, the gist of the method comprises in extending the working range of a feedback position pick-off unit to a value larger than one rotation (360°), such that feedback position pick-off units, which are commercially available but intended for other transmission shaft speeds and different gear ratios in the actuator drive stations, may be installed. The method relies on a combination of data delivered by a feedback position pick-off unit, which is also named "first position pick-off unit" and a station position pick-off unit, which is named "second position pick-off unit". While the main input for an acquired system flap position is the feedback position pick-off unit sensor, station position data provided by the station position pick-off unit are used as additional parameter to identify the clear relation between the feedback position pick-off unit sensor data and the system flap position, which is required.

The method according to the embodiment reflects the fact that a feedback position pick-off unit may be rotated more than once, i.e. about more than 360°. As the data delivered by the feedback position pick-off unit depends on the actual angle between 0 and 360°, the sensor will deliver an angle value of slightly above 0° even if the sensor has been rotated about slightly more than 360°. However, due to the rigid kinematical connection between the central drive unit and the drive stations coupled with the flaps, the station position pick-off units allow the indication how often the feedback position pick-off units have been rotated.

This is accomplished by dividing the complete angular range of the station position pick-off units by the number of intended rotations, i.e. the maximum number of rotations, of the feedback position pick-off units. This means, that the angular working range of the station position pick-off units is divided into a certain number of range sections. It is then determined in which of these range sections the actual second rotational position falls, to determine how many rotations the feedback position pick-off unit has already conducted.

For example, if the feedback position pick-off unit may theoretically be rotated four times (1440°) during a complete extension motion of a flap, and in case the station position pick-off unit fully uses the angular range of 360°, four corresponding angular sections may be created. These include the angle intervals [0-90°], [90°-180°], [180°-270°] and [270°-360°]. Every time the system flap angle is determined, the measured flap position from the feedback position pick-off unit is read out as well as the measured value of the station position pick-off unit. It is then determined into which of the respective angular sections the station position pick-off unit value falls for determining how many full rotations the flap position pick-off unit has conducted. Then, these full rotations are added to the value read out from the feedback position pick-off unit. This allows to determine the number of rotations e.g. a transmission shaft has conducted starting from a neutral position of this component.

Consequently, the working range of the feedback position pick-off unit is easily increased, while the necessity of modifying the first gear is eliminated. Still further, if the accuracy of the sensor integrated in the feedback position pick-off unit is maintained, the effective accuracy for measuring the rotational position of the component is increased with increasing maximum number of rotation. Hence, the method according to the embodiment allows a dramatic increase in the accuracy while the effort associated with conducting the method is clearly reduced.

In this context, it is noted that the second position pick-off unit may comprise a second gear, by means of which the second position pick-off unit is coupled with the flap. However, this is not necessary and may depend on the actual design of the second position pick-off unit and/or the sensor integrated therein.

It may also be possible that the feedback position pick-off unit is adapted for conducting more than one full rotation, but less than two, three or another integer number of full rotations, i.e. the working range of the feedback position pick-off unit is not exactly a multiple of 360°. In this case, the angle intervals used of the station position pick-off unit should be adapted accordingly. This means that the angular range of 360° of the station position pick-off unit may be divided into one large interval and one smaller interval, in case the feedback position pick-off unit may conduct just between one and two full rotations. If the feedback position pick-off unit may conduct only slightly more than two full rotations, the angular range of 360° of the station position pick-off unit may be divided into two equal large intervals and one additional, smaller interval.

If the rotational position of the transmission shaft is required to determine the exact position of the high lift flap, the first rotational position is divided by 360° and multiplied by the first gear ratio for determining the number of rotations of the transmission shaft. However, this may be modified in case other parameters are required for controlling the high lift system.

In an advantageous embodiment, determining the number of full rotations of the first position pick-off unit includes creating a plurality of angle sections in an angular working range of the at least one second position pick-off unit, wherein at least one angle section corresponds to a full rotation of the first position pick-off unit and determining, in which of the angle sections a value measured by the second position pick-off unit falls. Using this principle, detecting the number of already conducted full rotations may easily be accomplished.

Further, if the number of full rotations is not an integer, the method one of the angle sections is smaller than the other angle section and corresponds to a residual part above the last full rotation, and all other angle sections correspond to full rotations.

In the method according to the embodiment, acquiring position data from a second station position pick-off unit is required. As there is a plurality of station position pick-off units in the aircraft, which often comprise redundant sensors, different approaches regarding the selection of second position pick-off units used for the method are possible. For example, one station position pick-off unit may be chosen, which is used throughout the operation of the aircraft.

As an alternative, a group of station position pick-off units may be chosen from the plurality of station position pick-off units, which all deliver an angle value. These may be combined to a mean angle value.

Still further, a group of three station position pick-off units may be chosen, wherein the measured values of all of these are compared in order to identify a station position pick-off unit that may deliver an erroneous value, while using the other two, correct values.

The angular range of the second position pick-off unit may be divided into different angle intervals according to the following, considering the parameter "n" as number of full rotations, which may, but does not need to be an integer, of the first position pick-off unit and the parameter "$\beta_{max}$" as the working range of the second position pick-off unit:
$[0 \ldots \beta_{max}/n], [\beta_{max}/n \ldots 2 \cdot \beta_{max}/n], \ldots [x \cdot \beta_{max}/n \ldots \beta_{max}]$ For improving the accuracy of the method, i.e. the determination how many full rotations have been conducted already, the positions measured by the second position pick-off unit and the determination, in which of the respective angular sections they belong, are supported by the measured value of the first position pick-off unit. However, a sufficient safety margins should be considered, i.e. a few degrees. Resultantly, the determination to which angular section the measured value of the second position pick-off unit belongs is approved by a plausibility check, whether the first position pick-off unit delivers an appropriate value that corresponds to this determination. The method therefore may further comprise the step of conducting a plausibility check by evaluating, whether the measured value of the first position pick-off unit is slightly above 0° or slightly below 360°.

For example, if the second position pick-off unit delivers a value that is just associated with the lower limit of the second interval, it should be checked whether the feedback position pick-off unit already delivers a value slightly above 0° or whether the measured value is just below 360°. A lack of accuracy of the second position pick-off unit may thereby be compensated.

The embodiment further relates to a high lift system of an aircraft comprising a central power control unit for providing rotational power by means of a transmission shaft, actuator drive stations coupled with the power control unit and movable high lift surface. The high lift system according to the embodiment further comprises at least one control computer coupled with the central power control unit, a first position pick-off unit mechanically coupled with the power control unit by means of a first gear having a first gear ratio, at least one second position pick-off unit mechanically coupled with a driven element in at least one drive station. The at least one control computer is adapted for determining the number of full rotations the first position pick-off unit has accomplished between a neutral position and an intended maximum number of rotates based on an associated number of angle sections of the second position pick-off unit and the actual second rotational position, and for multiplying the number of full rotations of the first position pick-off unit with 360° and adding the resulting full rotations angle to the measured first rotational position to acquire the first rotational position. Still further, the embodiment relates to an aircraft having such a high lift system.

BRIEF DESCRIPTION OF THE DRAWINGS

The various embodiments will hereinafter be described in conjunction with the following drawing figures, wherein like numerals denote like elements, and.

Further characteristics, advantages and application options of the present embodiment are disclosed in the following description of the exemplary embodiments in the figures. All the described and/or illustrated characteristics per se and in any combination form the subject of the embodiment, irrespective of their composition in the individual claims or their interrelationships. Furthermore, identical or similar components in the figures have the same reference characters.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
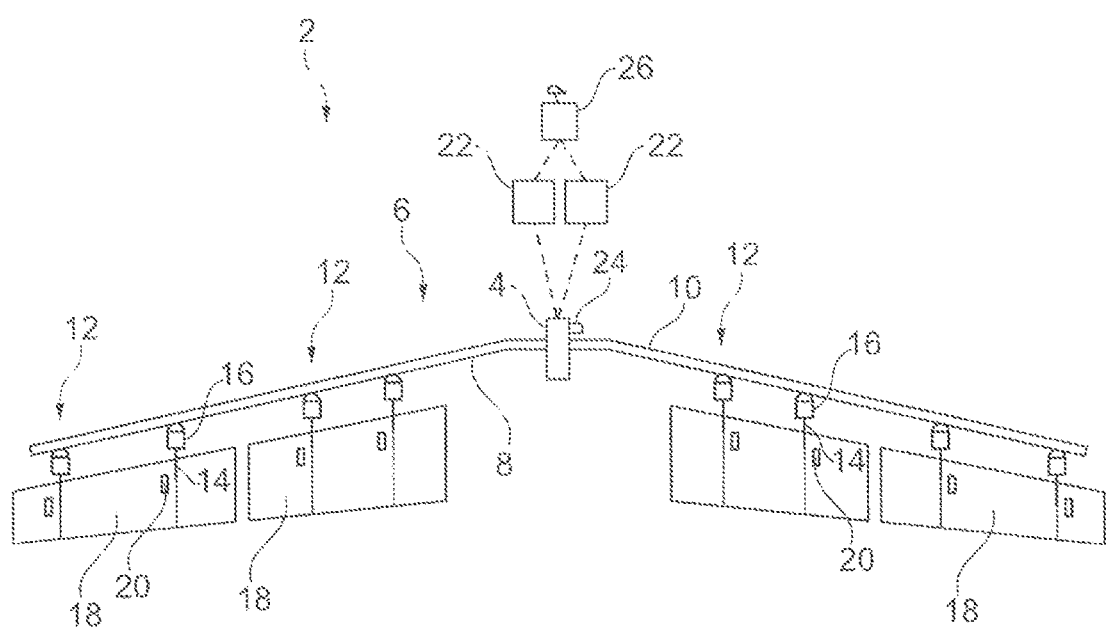
FIG. 1 shows a general architecture of a flap system.

In FIG. 1, a general setup of a high lift system 2 is shown. Here, a power control unit 4 is coupled with a transmission shaft system 6 comprising a left transmission shaft 8 and a right transmission shaft 10. These are coupled with drive stations 12 distributed along the transmission shafts 8 and 10 along a trailing edge section of a wing, which is not depicted in FIG. 1.

Each drive station 12 exemplarily comprises a spindle 14 as well as a nut 16, which is moved along the spindle 14 through the spindle rotation. Each flap 18 is exemplarily coupled with two drive stations 12 and comprises two station position pick-off units 20. These are usually used for detecting asymmetry cases, which may initiate the interruption of the operation of the system 2. Usually, two redundant flap control computers 22 are coupled with the PCU 4 and the station position pick-off units 20.

Furthermore, a feedback position pick-off unit 24 is coupled to the flap control computers 22 and allows the determination of the actual rotational position of the transmission shaft system 6, leading to the ability to determine the position of the flaps 18, which depends on the rotational position of the transmission shaft system 6. A flaps lever 26 provides an input into the flap control computers 22, which then drive the power control unit 4 such that the actually determined rotational position of the transmission shaft system 6 equals the commanded angle.

The feedback position pick-off unit 24 comprises an internal gear, which is not depicted in FIG. 1. The same applies to the station position pick-off units 20. While in common high lift systems the feedback position pick-off unit 24 is adapted for conducting a rotation of maximum 360°, the feedback position pick-off unit 24 of the high lift system 2 may be rotated more than about 360°.

Figure 2:
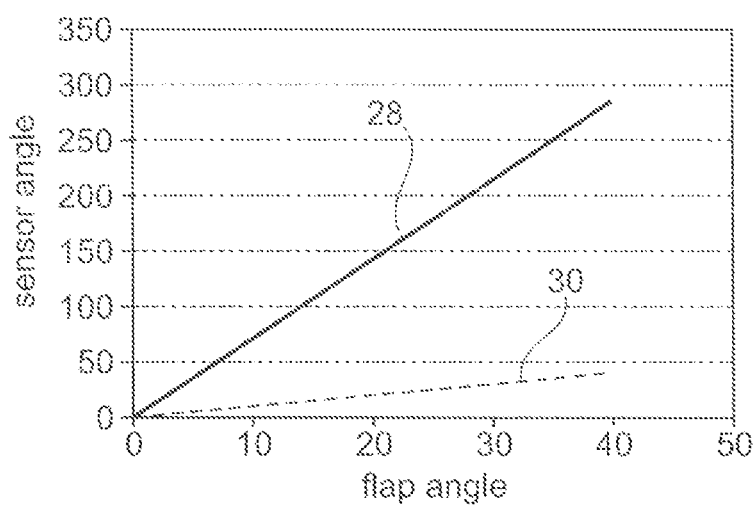
FIG. 2 shows a typical graph of flap position data with a limited measurement range.

As shown in FIG. 2, the position value 28 directly corresponds to a flap position 30, which is measured by a station position pick-off unit 20. However, an unambiguous relation between the value delivered by the feedback position pick-off unit 24 and the actual position of the flaps 18 is only unambiguous if the rotation of the feedback position pick-off unit 24 is limited to 360°.

Figure 3:
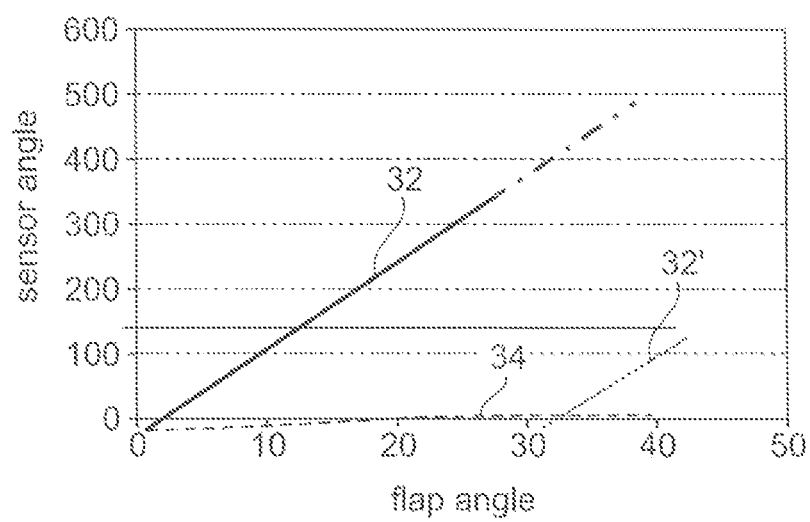
FIG. 3 shows a graph of flap position data with an extended measurement range.

As shown in FIG. 3, the value 32 delivered by the sensor in the feedback position pick-off unit 24 returns to 0 after a rotation about 360°, as indicated with curve 32'. Supported by the flap angle value 34 delivered by the station position pick-off unit 20, it may be determined whether the feedback position pick-off unit 24 has been rotated about 360° before.

In the example shown in FIG. 3, it is sufficient to roughly determine whether the station position pick-off unit 20 delivers an angle above 20° and to determine whether the feedback position pick-off 24 unit delivers a value of roughly under 150° such that a first full rotation can be detected.

Figure 4:
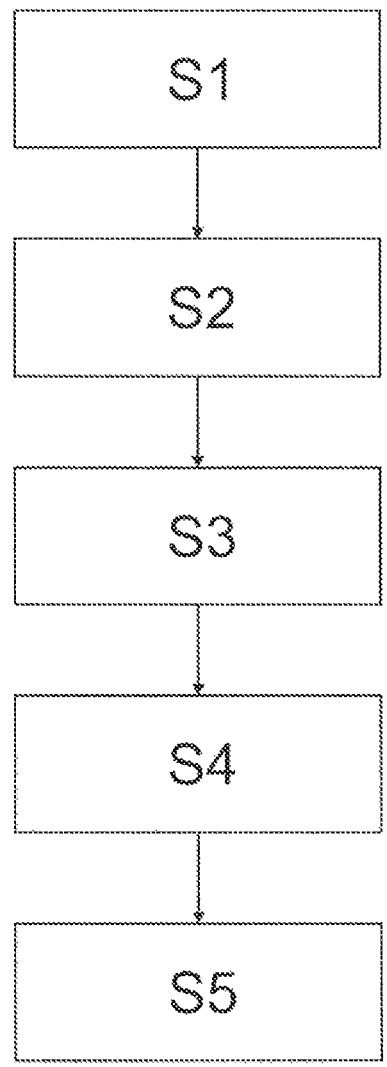
FIG. 4 is a flow chart that illustrates a method for determining the position of a component in a high lift system of an aircraft.

FIG. 4 shows a method comprising the steps of acquiring a first rotational position of a first position pick-off unit mechanically coupled with the power control unit by means of a first gear having a first gear ratio (step S1), and acquiring at least one second rotational position of at least one second position pick-off unit mechanically coupled with a driven element in at least one drive station (step S2). The method continues by determining the number of full rotations the first position pick-off unit has accomplished between a neutral position and an intended maximum number of rotation space on an associated number of angle sections of the at least one second position pick-off unit and the actual second rotational position (step S3), and multiplying the number of full rotations of the first position pick-off unit with 360° (step S4). The method continues by adding the resulting full rotation's angle to the measured first rotational position to acquire the first rotational position (step S5).

It should be pointed out that "comprising" does not exclude other elements or steps, and "a" or "an" does not exclude a plural number. Furthermore, it should be pointed out that characteristics or steps that have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for determining the position of a component in a high lift system of an aircraft, the high lift system comprising a power control unit for providing rotational power by means of a transmission shaft; and actuator drive stations coupled with the power control unit and movable high lift surfaces; the method comprising the steps of:
acquiring a first rotational position of a first position pick-off unit mechanically coupled with the power control unit by means of a first gear having a first gear ratio,
acquiring at least one second rotational position of at least one second position pick-off unit mechanically coupled with a driven element in at least one drive station,
determining a number of full rotations the first position pick-off unit has accomplished between a neutral position and an intended maximum number of rotations based on an associated number of angle sections of the at least one second position pick-off unit and a respective second rotational position, and
multiplying the number of full rotations of the first position pick-off unit by 360° to create a resulting full rotations angle; and
adding the resulting full rotations angle to the acquired first rotational position to acquire a position of a component in the high lift system.

2. The method of claim 1, wherein the first rotational position is divided by 360° and multiplied by the first gear ratio for determining a number of rotations of the transmission shaft.

3. The method of claim 1, wherein determining the number of full rotations of the first position pick-off unit includes creating a plurality of angle sections in an angular working range of the at least one second position pick-off unit, wherein at least one angle section corresponds to a full rotation of the first position pick-off unit and determining, in which of the angle sections a value measured by the at least one second position pick-off unit falls.

4. The method of claim 3,
wherein the number of full rotations is not an integer,
wherein one of the angle sections is smaller than the other angle sections and corresponds to a residual part above a last full rotation, and
wherein all other angle sections correspond to full rotations.

5. The method of claim 1, wherein measured values of a group of second position pick-off units are used, wherein the measured values are combined to a mean angle value.

6. The method of claim 1, wherein measured values of three second position pick-off units are acquired, wherein the measured values are compared in order to identify whether one of the measured values is faulty, and wherein one of the other two measured values for determining the number of full rotations of the first position pick-off unit is used.

7. The method according to claim 1, further comprising the step of conducting a plausibility check by evaluating, whether an acquired value of the first position pick-off unit is slightly above 0° or slightly below 360°.

8. A high lift system for an aircraft, comprising:
a power control unit for providing rotational power by means of a transmission shaft,
actuator drive stations coupled with the power control unit and movable high lift surfaces,
at least one control computer coupled with the power control unit,
a first position pick-off unit mechanically coupled with the power control unit by means of a first gear having a first gear ratio, and
at least one second position pick-off unit mechanically coupled with a driven element in at least one drive station,
wherein the at least one control computer is adapted for determining a number of full rotations the first position pick-off unit has accomplished between a neutral position and an intended maximum number of rotations based on an associated number of angle sections of the second position pick-off unit and a respective second rotational position, and for multiplying the number of full rotations of the first position pick-off unit with 360° to create a resulting full rotations angle, and adding the resulting full rotations angle to the acquired first rotational position to acquire a position of a component in a high lift system.

* * * * *